(12) United States Patent
Hattori et al.

(10) Patent No.: US 12,411,367 B2
(45) Date of Patent: Sep. 9, 2025

(54) COMPOSITE SUBSTRATE FOR ELECTRO-OPTICAL ELEMENT

(71) Applicant: NGK INSULATORS, LTD., Nagoya (JP)

(72) Inventors: Ryosuke Hattori, Ichinomiya (JP); Tomoyoshi Tai, Inazawa (JP); Keiichiro Asai, Nagoya (JP); Jungo Kondo, Miyoshi (JP)

(73) Assignee: NGK INSULATORS, LTD., Nagoya (JP)

( * ) Notice: Subject to any disclaimer, the term of this patent is extended or adjusted under 35 U.S.C. 154(b) by 719 days.

(21) Appl. No.: 17/649,682

(22) Filed: Feb. 2, 2022

(65) Prior Publication Data

US 2022/0155619 A1    May 19, 2022

Related U.S. Application Data

(63) Continuation of application No. PCT/JP2021/019037, filed on May 19, 2021.

(30) Foreign Application Priority Data

May 20, 2020 (JP) ................. 2020-088349

(51) Int. Cl.
 *G02F 1/035* (2006.01)
 *G02B 6/12* (2006.01)
(52) U.S. Cl.
 CPC ............... *G02F 1/035* (2013.01); *G02B 6/12* (2013.01); *G02B 2006/12142* (2013.01); *G02F 2202/09* (2013.01)
(58) Field of Classification Search
 CPC ................... G02F 1/03; G02F 1/0135
 (Continued)

(56) References Cited

U.S. PATENT DOCUMENTS 6,674,565 B2   1/2004 Kondo et al.
7,295,742 B2   11/2007 Sugita et al.
(Continued)

FOREIGN PATENT DOCUMENTS

DE   10 2017 125 099 A1   5/2018
JP   2002-040381 A   2/2002
(Continued)

OTHER PUBLICATIONS

"Tantalum pentoxide", Wikipedia article. (Year: 2019).*
(Continued)

*Primary Examiner* — Robert Tavlykaev
(74) *Attorney, Agent, or Firm* — BURR PATENT LAW, PLLC

(57) ABSTRACT

There is provided a composite substrate in which peeling is significantly suppressed, light propagation loss is small when used as an electro-optical element, and high-speed and low-voltage drive is possible, and which can achieve an extremely thin electro-optical element capable of maintaining excellent reliability even under a severe high-temperature environment. A composite substrate for an electro-optical element according to an embodiment of the present invention includes: an electro-optical crystal substrate having an electro-optical effect; a first high dielectric layer; a second high dielectric layer; and a support substrate in the stated order. The first high dielectric layer and the second high dielectric layer are directly joined to each other, and an amorphous layer is formed at a joining interface between the first high dielectric layer and the second high dielectric layer.

14 Claims, 2 Drawing Sheets

(58) Field of Classification Search
USPC .......................................................... 385/1–3
See application file for complete search history.

(56) References Cited

U.S. PATENT DOCUMENTS

| | | | |
|---|---|---|---|
| 7,548,678 B2 | 6/2009 | Sugita et al. | |
| 8,901,803 B2 | 12/2014 | Hori et al. | |
| 10,367,324 B2 | 7/2019 | Taira et al. | |
| 11,150,497 B2 | 10/2021 | Uno et al. | |
| 2018/0123309 A1 | 5/2018 | Taira et al. | |
| 2019/0036505 A1 | 1/2019 | Akiyama et al. | |
| 2019/0386640 A1 | 12/2019 | Akiyama et al. | |
| 2020/0013765 A1 | 1/2020 | Fountain, Jr. et al. | |
| 2021/0011217 A1* | 1/2021 | Zhang | G02F 1/225 |
| 2021/0072567 A1 | 3/2021 | Tai et al. | |
| 2021/0210673 A1 | 7/2021 | Hu et al. | |
| 2021/0247570 A1* | 8/2021 | Zhang | G02B 6/13 |
| 2021/0364696 A1* | 11/2021 | Reano | G02B 6/305 |
| 2021/0389613 A1 | 12/2021 | Tai et al. | |

FOREIGN PATENT DOCUMENTS

| | | |
|---|---|---|
| JP | 4174377 B2 | 10/2008 |
| JP | 2010-211241 A | 9/2010 |
| JP | 2012-161831 A | 8/2012 |
| JP | 2017-139720 A | 8/2017 |
| JP | 2018-117030 A | 7/2018 |
| JP | 2019-217530 A | 12/2019 |
| JP | 6646187 B1 | 2/2020 |
| JP | 6650551 B1 | 2/2020 |
| WO | 2014/077212 A1 | 5/2014 |
| WO | 2018/031916 A1 | 2/2018 |
| WO | 2019/071978 A1 | 4/2019 |
| WO | 2019/224908 A1 | 11/2019 |

OTHER PUBLICATIONS

"Relative permittivity", Wikipedia article. (Year: 2019).*
"SOI wafer fabricated with extremely thick deposited BOX layer using a surface activated bonding technique at room temperature" by Koga et al, Japanese Journal of Applied Physics 59, paper SBBB02 (Year: 2019).*
English translation of the International Preliminary Report on Patentability (Chapter I) dated Dec. 1, 2022 (Application No. PCT/JP2021/019037).
International Search Report and Written Opinion (Application No. PCT/JP2021/019037) dated Aug. 10, 2021 (with English translation).
Japanese Office Action (Application No. 2020-145642) dated Sep. 8, 2020 (with English translation).
Japanese Office Action (Application No. 2020-145642) dated Oct. 20, 2020 (with English translation).
High-k-Dielektrikum, Wikipedia, https://de.wikipedia.org/wiki/High-k-Dielektrikum, Archived in http://web.archive.org on Jun. 9, 2016 [retrieved on Sep. 12, 2024].
German Office Action (with English translation) dated Sep. 13, 2024 (Application No. 11 2021 000 100.0).

* cited by examiner

COMPOSITE SUBSTRATE FOR ELECTRO-OPTICAL ELEMENT

TECHNICAL FIELD

The present invention relates to a composite substrate for an electro-optical element.

BACKGROUND ART

Various electro-optical elements have been known. The electro-optical element can convert an electric signal into an optical signal through use of an electro-optical effect. The electro-optical element is adopted, for example, in optical and radio wave fusion communication, and the development thereof is underway in order to achieve high-speed and large-capacity communication, low power consumption (low drive voltage), and a low footprint. Because of this, for example, the adoption of a configuration of the electro-optical element using a composite substrate has started. As a composite substrate for an electro-optical element, there has been known a composite substrate in which an electro-optical crystal substrate having an electro-optical effect and a support substrate are integrated by direct joining through intermediation of a thin film layer (for example, a high dielectric oxide film). However, such a composite substrate has the following problems. When the electro-optical crystal substrate and the thin film layer are directly joined to each other, light propagation loss may occur. When the thin film layer and the support substrate are directly joined to each other, high-speed drive may be difficult, and depending on the situation, the joining itself may not be successful, with the result that a composite substrate may not be obtained.

CITATION LIST

Patent Literature

[PTL 1] JP 4174377 B2

SUMMARY OF INVENTION

Technical Problem

A main object of the present invention is to provide a composite substrate in which peeling is significantly suppressed, light propagation loss is small when used as an electro-optical element, and high-speed and low-voltage drive is possible, and which can achieve an extremely thin electro-optical element capable of maintaining excellent reliability even under a severe high-temperature environment.

Solution to Problem

A composite substrate for an electro-optical element according to an embodiment of the present invention includes: an electro-optical crystal substrate having an electro-optical effect; a first high dielectric layer; a second high dielectric layer; and a support substrate in the stated order. The first high dielectric layer and the second high dielectric layer are directly joined to each other, and an amorphous layer is formed at a joining interface between the first high dielectric layer and the second high dielectric layer.

In one embodiment of the present invention, the first high dielectric layer is directly formed on the electro-optical crystal substrate, and the second high dielectric layer is directly formed on the support substrate, and the support substrate contains silicon oxide as a main component, and an argon concentration in the support substrate is 1.0 atomic % or less.

In one embodiment of the present invention, the first high dielectric layer is directly formed on the electro-optical crystal substrate, a low dielectric layer is directly formed on the support substrate, and the second high dielectric layer is directly formed on the low dielectric layer. The low dielectric layer contains silicon oxide as a main component, and an argon concentration in the low dielectric layer is 1.0 atomic % or less.

In one embodiment of the present invention, argon concentrations in the first high dielectric layer and the second high dielectric layer are each from 1.0 atomic % to 10 atomic %.

In one embodiment of the present invention, the first high dielectric layer is directly formed on the electro-optical crystal substrate, a low dielectric layer is directly formed on the support substrate, and the second high dielectric layer is directly formed on the low dielectric layer. The low dielectric layer is formed of one selected from silicon oxide, aluminum oxide, magnesium fluoride, and calcium fluoride.

In one embodiment of the present invention, the first high dielectric layer is directly formed on the electro-optical crystal substrate, and the second high dielectric layer is directly formed on the support substrate. The electro-optical crystal substrate has a thickness of 0.1 μm or more and less than 1.0 μm, the first high dielectric layer has a thickness of 0.01 μm or more, and the first high dielectric layer and the second high dielectric layer have a total thickness of 0.10 μm or less.

In one embodiment of the present invention, the composite substrate for an electro-optical element further includes a low dielectric layer directly formed on the support substrate, and the second high dielectric layer is directly formed on the low dielectric layer.

In one embodiment of the present invention, the support substrate is formed of one selected from silicon, glass, sialon, mullite, aluminum nitride, silicon nitride, magnesium oxide, sapphire, quartz, crystal, gallium nitride, silicon carbide, and gallium oxide.

In one embodiment of the present invention, the electro-optical crystal substrate has a thickness of from 0.1 μm to 0.8 μm.

In one embodiment of the present invention, the electro-optical crystal substrate has a thickness of from 0.2 μm to 0.6 μm.

In one embodiment of the present invention, the electro-optical crystal substrate is formed of one selected from lithium niobate, lithium tantalate, potassium titanate phosphate, potassium lithium niobate, potassium niobate, potassium tantalate niobate, and a solid solution of lithium niobate and lithium tantalate.

In one embodiment of the present invention, the first high dielectric layer has a thickness of from 0.01 μm to 0.08 μm, and the second high dielectric layer has a thickness of from 0.001 μm to 0.04 μm.

In one embodiment of the present invention, the first high dielectric layer and the second high dielectric layer is each formed of one selected from tantalum oxide, niobium oxide, titanium oxide, aluminum oxide, hafnium oxide, and silicon.

In one embodiment of the present invention, the low dielectric layer has a thickness of more than 10 μm and 20 μm or less.

Advantageous Effects of Invention

According to the embodiment of the present invention, the two high dielectric layers are formed in the composite substrate for an electro-optical element, and the two high dielectric layers are directly joined to each other to integrate the electro-optical crystal substrate and the support substrate. As a result, it is possible to achieve a composite substrate in which the peeling is significantly suppressed, the light propagation loss is small when used as an electro-optical element, and the high-speed and low-voltage drive is possible. In one embodiment, when the support substrate or the low dielectric layer directly formed on the support substrate is formed of silicon oxide as a main component, and the argon concentration in the support substrate or the low dielectric layer is set to 1.0 atomic % or less, an extremely thin electro-optical element capable of maintaining excellent reliability even under a severe high-temperature environment can be achieved while the above-mentioned excellent effects are maintained. In one embodiment, when the thickness of the first high dielectric layer is set to a predetermined value or more, and the total thickness of the first high dielectric layer and the second high dielectric layer is set to a predetermined value or less, the electro-optical crystal substrate can be made extremely thin while the above-mentioned excellent effects are maintained, and as a result, an extremely thin electro-optical element can be achieved.

DESCRIPTION OF EMBODIMENTS

Embodiments of the present invention are described below. However, the present invention is not limited to these embodiments.

A. Overall Configuration of Composite Substrate for Electro-Optical Element

Figure 1:
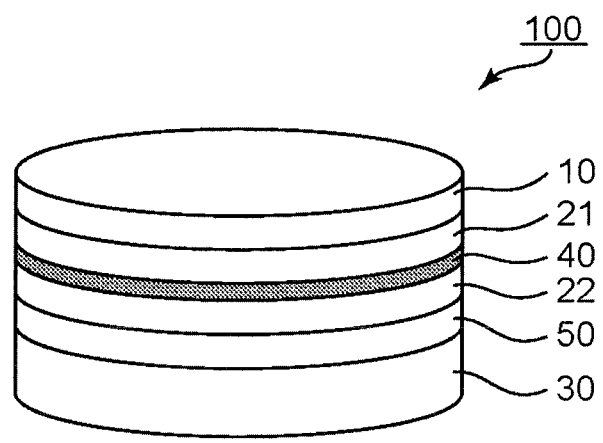
FIG. 1 is a schematic perspective view of a composite substrate for an electro-optical element according to one embodiment of the present invention.
Figure 2:
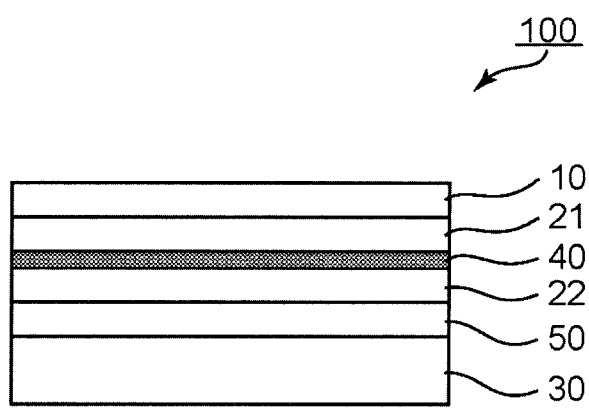
FIG. 2 is a schematic sectional view of the composite substrate for an electro-optical element of FIG. 1.

FIG. 1 is a schematic perspective view of a composite substrate for an electro-optical element (hereinafter sometimes simply referred to as "composite substrate") according to one embodiment of the present invention; and FIG. 2 is a schematic sectional view of the composite substrate of FIG. 1. The composite substrate according to the embodiment of the present invention may be typically produced in the form of a so-called wafer as illustrated in FIG. 1. The size of the composite substrate may be appropriately set depending on the purpose. For example, the diameter of the wafer may be 4 inches (about 10 cm). In general, a plurality of electro-optical elements may be produced from one composite substrate. The composite substrate is not limited to the form of the wafer, and may be produced and provided in various forms.

A composite substrate 100 of the illustrated example includes an electro-optical crystal substrate 10 having an electro-optical effect, a first high dielectric layer 21, a second high dielectric layer 22, and a support substrate 30 in the stated order. In the embodiment of the present invention, the first high dielectric layer 21 and the second high dielectric layer 22 are directly joined to each other. The electro-optical crystal substrate 10 and the support substrate 30 are integrated by the direct joining of the two high dielectric layers. For example, the first high dielectric layer 21 is formed on the surface of the electro-optical crystal substrate 10 by sputtering; the second high dielectric layer 22 is formed on the surface of the support substrate 30 by sputtering; and the first high dielectric layer 21 and the second high dielectric layer 22 of the respective laminates are directly joined to each other. Typically, as in the illustrated example, an amorphous layer 40 is formed at a joining interface of the direct joining. In the illustrated example, a low dielectric layer 50 is formed on the second high dielectric layer 22 side of the support substrate 30. The low dielectric layer 50 is any appropriate layer to be formed depending on the purpose, and may be omitted. The composite substrate 100 may further include any appropriate layer (not shown). The kind/function, number, combination, arrangement position, and the like of such layers may be appropriately set depending on the purpose. In particular, the configuration below the support substrate 30 or the low dielectric layer 50 (if present) (on an opposite side of the electro-optical crystal substrate) may be appropriately set depending on the purpose. For example, a metal film may be formed below the support substrate 30 or the low dielectric layer 50 (if present). Through formation of such a metal film, when an electro-optical element is produced from a composite substrate, unintended ripples (noise, fluctuation) in an output signal of the electro-optical element are suppressed, and normal operation can be maintained. As used herein, the "high dielectric layer" and the "low dielectric layer" mean that the dielectric constants of the first high dielectric layer 21 and the second high dielectric layer 22 are relatively larger than the dielectric constant of the low dielectric layer 50. When the low dielectric layer 50 is not formed, the foregoing means that the dielectric constants of the first high dielectric layer 21 and the second high dielectric layer 22 are relatively larger than the dielectric constant of the support substrate 30. That is, the first high dielectric layer 21, the second high dielectric layer 22, and the low dielectric layer 50 are not defined by specific values of the dielectric constants of the respective layers. Further, the magnitude relationship between the dielectric constants of those layers and the dielectric constant of the electro-optical crystal substrate does not matter.

When the electro-optical crystal substrate 10 and the support substrate 30 are integrated by direct joining, the peeling of the composite substrate can be satisfactorily suppressed, and as a result, damage (for example, cracking) to the electro-optical crystal substrate caused by such peeling can be satisfactorily suppressed. Further, through direct joining without using an adhesive, adverse effects caused by deterioration and deformation of the adhesive can be eliminated, and hence high reliability can be achieved. In addition, there is no dielectric loss caused by the adhesive.

According to the embodiment of the present invention, the following advantages can be obtained by directly joining the first high dielectric layer 21 and the second high dielectric layer 22 to each other. When the electro-optical element is thinned (typically, the thickness of the electro-optical crystal substrate is set to 1 µm or less), it is preferred to reinforce the electro-optical element through combination with the support substrate. Further, it has been found that it is effective to form a high dielectric layer in order to satisfy the speed matching condition to achieve high-speed and low-voltage drive in such a composite substrate (electro-optical element). Until now, development has been advanced only with the electro-optical crystal substrate and the support substrate (low dielectric substrate). However, when the thickness of the electro-optical crystal substrate becomes 1 µm or less as described above, the microwave effective dielectric constant (refractive index) may become too small. When a high dielectric layer is formed between the electro-optical crystal substrate and the support substrate, an excessive decrease in microwave effective dielectric constant (refractive index) can be suppressed, and the speed matching condition can be satisfied. Herein, when the high dielectric layer is a single layer, in order to integrate the electro-optical crystal substrate and the support substrate by direct joining, direct joining between the electro-optical crystal substrate and the high dielectric layer or direct joining between the high dielectric layer and the support substrate is required. The inventors of the present invention have newly found that the position of an amorphous layer that may be formed by direct joining through intermediation of a single high dielectric layer has a great effect on the characteristics of an electro-optical element (for example, an optical modulator), to thereby complete the present invention. That is, when the electro-optical crystal substrate and the high dielectric layer are directly joined to each other, the amorphous layer formed at the joining interface propagates into the electro-optical crystal substrate. As a result, light scattering and/or absorption occurs in the electro-optical crystal substrate, and in addition, the electro-optical constant of the electro-optical crystal substrate becomes insufficient. When the high dielectric layer and the support substrate are directly joined to each other, the material (substantially, atoms) forming the support substrate may be diffused and transferred to the high dielectric layer through the amorphous layer formed at the joining interface. As a result, a decrease in dielectric constant and/or an increase in conductivity of the high dielectric layer occurs, which may cause an electric shielding effect. Consequently, the speed matching condition cannot be satisfied, and high-speed and low-voltage drive may become difficult. Further, even when an attempt is made to directly join the high dielectric layer and the support substrate to each other, the joining itself may not be successful, with the result that a composite substrate may not be obtained. In contrast to such direct joining through intermediation of a single high dielectric layer, according to the embodiment of the present invention, the two high dielectric layers are directly joined to each other to integrate the electro-optical crystal substrate and the support substrate. Because of this, the amorphous layer can be formed between the two high dielectric layers, and the amorphous layer can be separated from both of the electro-optical crystal substrate and the support substrate. As a result, the adverse effects of the amorphous layer can be prevented while both the effects of the composite substrate and the effects of the high dielectric layer are satisfactorily maintained. As a result, it is possible to achieve a composite substrate in which the peeling is significantly suppressed, the light propagation loss is small when used as an electro-optical element, and the high-speed and low-voltage drive is possible.

As used herein, the "direct joining" means that constituent elements of a composite substrate (in the examples of FIG. 1 and FIG. 2, the first high dielectric layer 21 and the second high dielectric layer 22) are joined to each other without intermediation of an adhesive. The form of direct joining may be appropriately set depending on the configuration of the layers or substrates to be joined to each other. For example, direct joining may be achieved by the following procedure. In a high vacuum chamber (for example, about $1 \times 10^{-6}$ Pa), a neutralized beam is applied to each joining surface of the constituent elements (layers or substrates) to be joined to each other. As a result, each joining surface is activated. Then, in a vacuum atmosphere, the activated joining surfaces are brought into contact with each other and joined to each other at normal temperature. The load at the time of the joining may be, for example, from 100 N to 20,000 N. In one embodiment, when the surface activation is performed with a neutralized beam, an inert gas is introduced into a chamber, and a high voltage is applied from a DC power source to electrodes arranged in the chamber. With such a configuration, electrons move due to the electric field generated between the electrode (positive electrode) and the chamber (negative electrode), and a beam of atoms and ions caused by the inert gas is generated. Of the beams having reached a grid, an ion beam is neutralized by the grid, and hence the beam of neutral atoms is emitted from a high-speed atom beam source. The atomic species forming the beam is preferably an inert gas element (for example, argon (Ar) or nitrogen (N)). The voltage at the time of activation by beam irradiation is, for example, from 0.5 kV to 2.0 kV, and the electric current is, for example, from 50 mA to 200 mA.

In one embodiment, the support substrate typically contains silicon oxide as a main component. Further, the argon concentration in the support substrate is typically 1.0 atomic % or less, preferably 0.8 atomic % or less. It is preferred that the argon concentration in the support substrate be as small as possible, and the lower limit thereof may be, for example, 0.1 atomic %. When the support substrate has such a configuration, the following effects can be obtained. According to the embodiment of the present invention, as described above, even when the electro-optical crystal substrate is thinned to, for example, about 1 µm, the peeling of a joining portion can be significantly suppressed. Meanwhile, in recent years, there has been a demand for further thinning of the electro-optical crystal substrate. In this connection, the inventors of the present invention have newly found that, when the electro-optical crystal substrate is thinned to less than 1.0 µm (for example, 0.6 µm), the electro-optical crystal substrate may be peeled under a severe high-temperature environment (for example, after a long-term heating reliability test). The inventors of the present invention have made extensive investigations regarding such peeling, and as a result, have found that, when the film quality of the high dielectric layer is improved and the thickness of the high dielectric layer is reduced, the peeling of the electro-optical crystal substrate under a severe high-temperature environment can be significantly suppressed. For example, when the argon concentration of the high dielectric layer is controlled typically to 10 atomic % or less, and the thickness of the high dielectric layer is controlled typically to 0.2 µm or less, the peeling of the electro-optical crystal substrate can be significantly suppressed even under a severe high-temperature environment. Further, the inventors of the present invention have made extensive investigations regarding the requirements for forming a thin high dielectric layer having such excellent film quality. As a result, the inventors of the present invention have found that it is mainly required to control the state of the substrate or the layer on which the high dielectric layer is formed, and further, have found that, when the support substrate on which the second high dielectric layer is formed is formed of silicon oxide as a main component, a thin second high dielectric layer having excellent film quality can be formed. That is, when the support substrate has the above-mentioned configuration, it is possible to achieve a composite substrate including an extremely thin (for example, the thickness is less than 1 μm) electro-optical crystal substrate, in which the peeling is significantly suppressed even under a severe high-temperature environment. As a result, it is possible to achieve an extremely thin electro-optical element capable of maintaining excellent reliability even under a severe high-temperature environment Such effects solve the problem recognized only when the electro-optical crystal substrate is further thinned, and are unexpectedly excellent effects. When the peeling of the electro-optical crystal substrate under a severe high-temperature environment as described above is suppressed, the other excellent effects achieved in the embodiment of the present invention can be maintained even under a severe high-temperature environment. Specifically, according to the embodiment of the present invention, even under a severe high-temperature environment, the light propagation loss can be maintained to be small, and high-speed and low-voltage drive can be maintained. The argon concentration in the support substrate can be controlled within the above-mentioned desired ranges, for example, by forming the support substrate through use of a sol-gel method to highly purify the support substrate, by irradiating the formed support substrate with soft X-rays, or by combining the foregoing. As used herein, the first high dielectric layer and the second high dielectric layer may be collectively referred to as "high dielectric layer." When it is required to distinguish between the first high dielectric layer and the second high dielectric layer, "first" and "second" are specified.

In one embodiment, when the low dielectric layer is formed, the low dielectric layer may be configured so that the low dielectric layer contains silicon oxide as a main component, and the argon concentration in the low dielectric layer is 1.0 atomic % or less. When the low dielectric layer is configured as described above, the effect similar to the effect achieved by controlling the argon concentration of the support substrate can be obtained. Further, with such a configuration, the options for the configuration of the support substrate can be expanded. For example, the support substrate can be formed of a material other than silicon oxide. The argon concentration in the low dielectric layer may be controlled by adjusting the argon partial pressure at the time of forming the low dielectric layer (typically, at the time of sputtering).

As the thickness of each of the high dielectric layers, any appropriate thickness may be respectively adopted. The thickness of each of the high dielectric layers may be, for example, from 0.001 μm to 1.0 μm, in addition, for example, from 0.001 μm to 0.1 μm, in addition, for example, from 0.01 μm to 0.1 μm. When the thickness of each of the high dielectric layers falls within such ranges, there are advantages in that an excessive decrease in microwave effective dielectric constant (refractive index) caused by the low dielectric layer and the support substrate can be suppressed, and at the same time, an increase in microwave effective dielectric constant can be reduced. Further, in the case where the thickness of each of the high dielectric layers falls within such ranges (in particular, the thickness is 0.1 μm or less), even when the electro-optical crystal substrate is extremely thinned (for example, less than 1 μm), the peeling of the electro-optical crystal substrate under a severe high-temperature environment can be significantly suppressed. As a result, it is possible to achieve an extremely thin electro-optical element capable of maintaining excellent reliability even under a severe high-temperature environment. The total thickness of the first high dielectric layer and the second high dielectric layer may be, for example, from 0.005 μm to 0.2 μm, in addition, for example, from 0.008 μm to 0.15 μm, in addition, for example, from 0.01 μm to 0.1 μm, in addition, for example, from 0.03 μm to 0.08 μm. When the total thickness of the first high dielectric layer and the second high dielectric layer is set to within such ranges, the effect achieved by controlling the thickness of each of the high dielectric layers can become further remarkable.

In one embodiment, the thickness of the first high dielectric layer is typically 0.01 μm or more, preferably 0.02 μm or more, more preferably 0.03 μm or more. The thickness of the first high dielectric layer may be, for example, 0.08 μm or less, in addition, for example, 0.07 μm or less. Further, the total thickness of the first high dielectric layer and the second high dielectric layer is typically 0.10 μm or less, preferably from 0.02 μm to 0.10 μm, more preferably from 0.02 μm to 0.08 μm, still more preferably from 0.03 μm to 0.07 μm. With such a configuration, the electro-optical crystal substrate can be extremely thinned while the excellent effects achieved by directly joining the two high dielectric layers to integrate the electro-optical crystal substrate and the support substrate (typically, significant suppression of the peeling, suppression of the light propagation loss when used as an electro-optical element, and achievement of the high-speed and low-voltage drive) are maintained. In other words, with such a configuration, even when the electro-optical crystal substrate is thinned to, for example, less than 1 μm, in addition, for example, 0.8 μm or less, in addition, for example, 0.7 μm or less, in addition, for example, 0.6 μm or less, the above-mentioned excellent effects can be maintained. When the thickness of the first high dielectric layer is too small, argon atoms may be diffused to the electro-optical crystal substrate at the time of direct joining (more specifically, at the time of irradiation with a neutralized beam), and/or the crystallinity of the electro-optical crystal substrate may be deteriorated. As a result, a satisfactory drive voltage may not be achieved, and/or the light propagation loss may be increased. When the total thickness is too large, it becomes difficult to satisfy the speed matching condition, and the modulation band may be decreased. Regarding the thickness of the second high dielectric layer, any appropriate thickness can be adopted as long as the thickness of the first high dielectric layer satisfies the above-mentioned desired ranges, and the total thickness of the first high dielectric layer and the second high dielectric layer satisfies the above-mentioned desired ranges. The thickness of the second high dielectric layer is preferably from 0.001 μm to 0.04 μm, more preferably from 0.005 μm to 0.035 μm, still more preferably from 0.01 μm to 0.03 μm. When the thickness of the second high dielectric layer falls within such ranges, the function of the second high dielectric layer can be sufficiently ensured.

Now, the constituent elements (substrates or layers) of the composite substrate are specifically described.

B. Electro-Optical Crystal Substrate

The electro-optical crystal substrate 10 may serve as a layer (functional layer) having an electro-optical effect in the electro-optical element. For example, a part or an entirety of the electro-optical crystal substrate 10 may serve as an optical waveguide for transmitting light in the electro-optical element. The electro-optical crystal substrate 10 has an upper surface exposed to outside and a lower surface located in the composite substrate. The electro-optical crystal substrate 10 is formed of a crystal of a material having an electro-optical effect. Specifically, the optical constant (for example, the refractive index) of the electro-optical crystal substrate 10 may be changed when an electric field is applied. In one embodiment, a c-axis of the electro-optical crystal substrate 10 may be parallel to the electro-optical crystal substrate 10. That is, the electro-optical crystal substrate 10 may be an X-cut substrate or a Y-cut substrate. In another embodiment, the c-axis of the electro-optical crystal substrate 10 may be perpendicular to the electro-optical crystal substrate 10. That is, the electro-optical crystal substrate 10 may be a Z-cut substrate. The thickness of the electro-optical crystal substrate 10 may be set to any appropriate thickness depending on the purpose. The thickness of the electro-optical crystal substrate 10 may be, for example, from 0.1 µm to 10 µm. As described later, the composite substrate is reinforced by the support substrate, and hence the thickness of the electro-optical crystal substrate can be reduced. The thickness of the electro-optical crystal substrate is preferably 0.2 µm or more, more preferably 0.3 µm or more, still more preferably 0.45 µm or more. When the lower limit of the thickness of the electro-optical crystal substrate falls within such ranges, the light propagation loss can be reduced in the electro-optical element. Meanwhile, the thickness of the electro-optical crystal substrate is preferably 5.0 µm or less, more preferably 2.8 µm or less, still more preferably 1.0 µm or less, yet still more preferably less than 1.0 µm, particularly preferably 0.8 µm or less, further particularly preferably 0.6 µm or less. When the upper limit of the thickness of the electro-optical crystal substrate falls within such ranges, the high-speed and low-voltage drive performance of the electro-optical element can be improved. In addition, when the thickness of the electro-optical crystal substrate falls within such ranges, the effect achieved by using the high dielectric layer becomes remarkable. That is, drive at a higher speed and a lower voltage can be achieved while light propagation loss is suppressed. Further, according to the embodiment of the present invention, even when such an extremely thin electro-optical crystal substrate is used, defects under a severe high-temperature environment are suppressed. Accordingly, it is possible to achieve an extremely thin electro-optical element capable of maintaining excellent reliability even under a severe high-temperature environment.

As a material forming the electro-optical crystal substrate 10, any appropriate material may be used as long as the effects achieved in the embodiment of the present invention can be obtained. As such a material, there is typically given a dielectric (for example, ceramics). Specific examples thereof include lithium niobate (LiNbO$_3$: LN), lithium tantalate (LiTaO$_3$: LT), potassium titanate phosphate (KTiOPO$_4$: KTP), potassium lithium niobate (K$_x$Li$_{(1-x)}$NbO$_2$: KLN), potassium niobate (KNbO$_3$: KN), potassium tantalate niobate (KNb$_x$Ta$_{(1-x)}$O$_3$: KTN), and a solid solution of lithium niobate and lithium tantalate.

C. Support Substrate

The support substrate 30 has an upper surface located in the composite substrate and a lower surface exposed to outside. The support substrate 30 is formed in order to increase the strength of the composite substrate. With such configuration, the thickness of the electro-optical crystal substrate can be reduced. As the support substrate 30, any appropriate configuration may be adopted. Specific examples of the material forming the support substrate include silicon (Si), glass, sialon (Si$_3$N$_4$—Al$_2$O$_3$), mullite (3Al$_2$O$_3$.2SiO$_2$, 2Al$_2$O$_3$.3SiO$_2$), aluminum nitride (AlN), silicon nitride (Si$_3$N$_4$), magnesium oxide (MgO), sapphire, quartz, crystal, gallium nitride (GaN), silicon carbide (SiC), and gallium oxide (Ga$_2$O$_3$). In one embodiment, the support substrate 30 contains silicon oxide as a main component as described above. That is, the support substrate may be formed of, for example, glass. It is preferred that the coefficient of linear expansion of the material forming the support substrate 30 be as close as possible to the coefficient of linear expansion of the material forming the electro-optical crystal substrate 10. With such a configuration, thermal deformation (typically, warpage) of the composite substrate can be suppressed. Preferably, the coefficient of linear expansion of the material forming the support substrate 30 falls within a range of from 50% to 150% with respect to the coefficient of linear expansion of the material forming the electro-optical crystal substrate 10. From this viewpoint, the constituent material of the support substrate 30 may be the same as that of the electro-optical crystal substrate 10, and in particular, when LN or LT is used, a substrate having suppressed its pyroelectricity may be used.

As the thickness of the support substrate, any appropriate thickness may be adopted as long as the support substrate has the effect of reinforcing the composite substrate. The thickness of the support substrate is, for example, from 100 µm to 1,000 µm. When the thickness of the support substrate is too small, the reinforcing effect and handleability may become insufficient. When the thickness of the support substrate is too large, the following problems may occur: (1) The thickness of the substrate becomes larger to make the flow difficult in a conventional process; (2) The electro-optical element to be obtained becomes thicker, and hence a package size becomes larger than that of the conventional one; (3) The heat dissipation of the support substrate becomes more insufficient; and (4) Ripples are liable to occur in a low frequency range.

As described above, the low dielectric layer 50 may be formed on the support substrate 30. When the low dielectric layer is formed, the speed matching condition can be satisfied only with a low dielectric constant regardless of the support substrate. In addition, there is no mutual movement of atoms between the second high dielectric layer 22 and the support substrate 30, and the difference in dielectric constant at the interface (as a result, the difference in refractive index) can be increased. As a result, it is possible to provide an electro-optical element which is produced as designed and in which a variation at the time of production and a change with time caused by the environment are small, without increasing the thickness of the high dielectric layer. Further, through arrangement of the low dielectric layer, the options for the material for the support substrate can be expanded. As the low dielectric layer, any appropriate configuration may be adopted as long as the low dielectric layer has such effects. Specific examples of the material forming the low dielectric layer 50 include silicon oxide (SiO$_2$), aluminum oxide (Al$_2$O$_3$), magnesium fluoride (MgF$_2$), and calcium fluoride (CaF$_2$). As described above, the low dielectric layer may be configured so that the low dielectric layer contains silicon oxide as a main component, and the argon concentration in the low dielectric layer is 1.0 atomic % or less.

Any appropriate thickness may be adopted as the thickness of the low dielectric layer. The thickness of the low dielectric layer may be, for example, from 0.6 µm to 20 µm, in addition, for example, from 5 µm to 15 µm, in addition, for example, more than 10 µm and 20 µm or less, in addition, for example, from 12 µm to 20 µm, in addition, for example, from 12 µm to 15 µm. When the thickness of the low dielectric layer falls within such ranges, there is an advantage in that the speed matching condition can be satisfied regardless of the support substrate or mainly with the low dielectric layer. When the low dielectric layer is thick (for example, when the thickness is more than 10 µm), the effect achieved by controlling the argon concentration of the low dielectric layer may become more remarkable. That is, through setting of the argon concentration of the low dielectric layer within the above-mentioned desired ranges, the total amount of argon in the low dielectric layer can be prevented from becoming excessively large even when the low dielectric layer becomes thicker. As a result, even when the low dielectric layer becomes thicker, the argon concentration of the high dielectric layer can be controlled to a predetermined value or less, and the peeling of the electro-optical crystal substrate can be significantly suppressed even under a severe high-temperature environment.

D. High Dielectric Layer

The first high dielectric layer 21 and the second high dielectric layer 22 may each have the same configuration (substantially, constituent material and thickness), or may have different configurations. Preferably, the first high dielectric layer 21 and the second high dielectric layer 22 may be formed of the same material. When the first high dielectric layer 21 and the second high dielectric layer 22, which are formed of different constituent materials, are directly joined to each other, materials (substantially, atoms) forming the first high dielectric layer and the second high dielectric layer may be diffused and transferred to each other through the amorphous layer formed at the joining interface. As a result, portions of the first high dielectric layer and the second high dielectric layer in the vicinity of the amorphous layer may each have a composition different from that of the other portions. As a result, there is a risk in that an unexpected increase in conductivity and/or generation of an excessive stress may be caused. When the first high dielectric layer and the second high dielectric layer are formed of the same material, such defects can be prevented.

As the high dielectric layer, any appropriate configuration may be adopted as long as the high dielectric layer has the effect of suppressing an excessive decrease in microwave effective dielectric constant (refractive index) and achieving high-speed and low-voltage drive. Specific examples of the material forming the high dielectric layer include tantalum oxide ($Ta_2O_5$), niobium oxide ($Nb_2O_5$), titanium oxide ($TiO_2$), aluminum oxide, hafnium oxide, and silicon (e.g., amorphous silicon).

The thickness of the first high dielectric layer, the thickness of the second high dielectric layer, and the total thickness of the first high dielectric layer and the second high dielectric layer are as described in the section A.

The argon concentration in the high dielectric layer may be, for example, from 1.0 atomic % to 10 atomic %, in addition, for example, from 1.0 atomic % to 8.0 atomic %, in addition, for example, from 1.0 atomic % to 6.0 atomic %, in addition, for example, 1.0 atomic % to 5.0 atomic %, in addition, for example, from 2.0 atomic % to 10 atomic %, in addition, for example, from 4.0 atomic % to 10 atomic %, in addition, for example, from 5.0 atomic % to 10 atomic %. In the case where the argon concentration of the high dielectric layer falls within such ranges, even when the electro-optical crystal substrate is extremely thinned (for example, less than 1 µm), the peeling of the electro-optical crystal substrate under a severe high-temperature environment can be significantly suppressed. As a result, it is possible to achieve an extremely thin electro-optical element capable of maintaining excellent reliability even under a severe high-temperature environment. As described above, such an argon concentration of the high dielectric layer may be achieved by forming the support substrate or the low dielectric layer (if present) so that the support substrate or the low dielectric layer contains silicon oxide as a main component and by setting the argon concentration in the support substrate or the low dielectric layer to 1.0 atomic % or less.

E. Amorphous Layer

The amorphous layer 40 is a layer formed at a joining interface by direct joining of the first high dielectric layer 21 and the second high dielectric layer 22. As the name implies, the amorphous layer 40 has an amorphous structure, and is formed of an element forming the first high dielectric layer 21 and an element forming the second high dielectric layer 22. Typically, the amorphous layer may further contain atomic species (typically, argon and nitrogen) forming a neutral atom beam to be used for direct joining. The content of such atomic species in the amorphous layer may be, for example, from 1.5 atomic % to 2.5 atomic %.

The thickness of the amorphous layer may be, for example, from 0.1 nm to 100 nm, or for example, from 2 nm to 15 nm.

The amorphous layer 40 is formed when the atoms of the constituent materials of the first high dielectric layer 21 and the second high dielectric layer 22 are diffused in direct joining therebetween. Accordingly, the upper surface (interface with the first high dielectric layer 21) and the lower surface (interface with the second high dielectric layer 22) of the amorphous layer are not necessarily flat. The arithmetic average roughness of each of the upper surface and the lower surface of the amorphous layer may be, for example, from 0.1 nm to 10 nm. Further, an upper portion and a lower portion of the amorphous layer may have different compositions due to such a forming process. When such an amorphous layer is formed at the interface between the electro-optical substrate or the support substrate and the high dielectric layer, as described above, the amorphous layer itself may have adverse effects on the electro-optical crystal substrate, or the constituent material of the support substrate may be diffused through the amorphous layer to have adverse effects on the high dielectric layer. According to the embodiment of the present invention, the amorphous layer can be formed so as to be separated from both the electro-optical crystal substrate and the support substrate by directly joining the first high dielectric layer 21 and the second high dielectric layer 22, and hence such defects can be prevented.

EXAMPLES

Hereinafter, the present invention is specifically described by way of Examples. However, the present invention is not limited by these Examples.

Example 1

An X-cut lithium niobate substrate having a diameter of 4 inches was prepared as an electro-optical crystal substrate, and a silicon substrate having a diameter of 4 inches (thickness: 500 µm) was prepared as a support substrate. First, tantalum oxide was sputtered onto the electro-optical crystal substrate to form a first high dielectric layer having a thickness of 0.03 µm. Next, silicon oxide was sputtered onto the support substrate to form a low dielectric layer having a thickness of 10.0 µm. The obtained low dielectric layer was slightly subjected to CMP to reduce the arithmetic average roughness Ra on the surface of the low dielectric layer. Next, the surface of the low dielectric layer was washed, and tantalum oxide was sputtered onto the washed surface to form a second high dielectric layer having a thickness of 0.03 µm. Here, the arithmetic average roughness of the interface between the second high dielectric layer and the low dielectric layer and the arithmetic average roughness of the interface between the low dielectric layer and the support substrate were measured through use of an atomic force microscope and found to be 0.2 nm at 10 µm square. Next, the surfaces of the first high dielectric layer and the second high dielectric layer were washed, and then the first high dielectric layer and the second high dielectric layer were directly joined to each other to integrate the electro-optical crystal substrate and the support substrate. The direct joining was performed as follows. The electro-optical crystal substrate and the support substrate were loaded into a vacuum chamber, and joining surfaces of the electro-optical crystal substrate and the support substrate (surfaces of the first high dielectric layer and the second high dielectric layer) were irradiated with a high-speed Ar neutral atom beam (acceleration voltage: 1 kV, Ar flow rate: 60 sccm) for 70 seconds in a vacuum on the order of $10^{-6}$ Pa. After the irradiation, the electro-optical crystal substrate and the support substrate were left to stand for 10 minutes so that they were allowed to cool. Then, the joining surfaces (beam irradiation surfaces of the first high dielectric layer and the second high dielectric layer) of the electro-optical crystal substrate and the support substrate were brought into contact with each other and pressurized at 4.90 kN for 2 minutes to join the electro-optical crystal substrate and the support substrate to each other. After the joining, the electro-optical crystal substrate was polished to have a thickness of 0.5 µm to obtain the composite substrate for an electro-optical element illustrated in FIG. 2. In the obtained composite substrate for an electro-optical element, no defects such as peeling were observed at the joining interface.

Through use of the composite substrate obtained in the above, an optical waveguide (ridge type waveguide) and electrodes were formed to produce an optical modulator. When the gap between the electrodes was set to 3 µm, and an electrode length L was set to 1 cm, a product Vπ·L of a half wavelength voltage Vπ and the electrode length L was 1.0 Vcm. The propagation loss of the optical waveguide was 0.5 dB. Further, as a result of measuring the modulation band of the optical modulator with an optical component analyzer, the modulation band was 50 GHz, and no ripples were detected in modulation characteristics at a frequency equal to or less than this frequency.

Example 2

A composite substrate for an electro-optical element similar to that of FIG. 2 (provided that the low dielectric layer was not present between the second high dielectric layer and the support substrate) was obtained in the same manner as in Example 1 except that a quartz glass substrate (thickness: 500 µm) was used as the support substrate and a low dielectric layer was not formed on the support substrate. In the obtained composite substrate for an electro-optical element, no defects such as peeling were observed at the joining interface.

Further, an optical modulator was produced from the obtained composite substrate. The product Vπ·L of the half wavelength voltage Vπ and the electrode length L was 1.0 Vcm. The propagation loss of the optical waveguide was 0.5 dB. Further, the modulation band was 50 GHz, and no ripples were detected in modulation characteristics at a frequency equal to or less than this frequency.

Comparative Example 1

Figure 3:
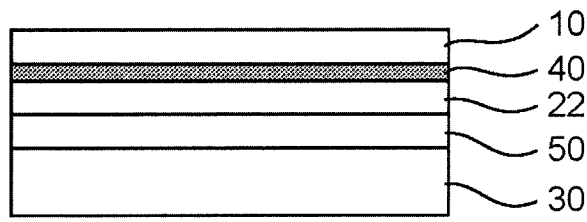
FIG. 3 is a schematic sectional view of a composite substrate for an electro-optical element of each of Comparative Example 1, Comparative Example 3, Comparative Example 5, Comparative Example 7, Comparative Example 9, and Comparative Example 11.

A composite substrate for an electro-optical element of FIG. 3 was obtained in the same manner as in Example 1 except that the first high dielectric layer was not formed on the electro-optical crystal substrate (that is, the electro-optical crystal substrate 10 and the second high dielectric layer 22 were directly joined to each other). In the obtained composite substrate for an electro-optical element, no defects such as peeling were observed at the joining interface.

Further, an optical modulator was produced from the obtained composite substrate. The product Vπ·L of the half wavelength voltage Vπ and the electrode length L was 1.2 Vcm. The propagation loss of the optical waveguide was 1.0 dB. Further, the modulation band was 50 GHz, and no ripples were detected in modulation characteristics at a frequency equal to or less than this frequency.

As the reason for an increase in half wavelength voltage, it is conceived that the amorphous layer 40 formed at the joining interface propagated into the electro-optical crystal substrate 10, and hence the electro-optical effect of a lithium niobate crystal was decreased in this region. It may be inferred that a change in refractive index of the optical electric field distributed in this region caused by the application of a voltage became smaller, and the amount of a phase shift of light propagating in the optical waveguide was decreased, with the result that the half wavelength voltage of the optical modulator was increased.

In addition, as the reason for an increase in light propagation loss, the absorption and/or scattering by the amorphous layer 40 formed at the joining interface is conceived. It may be inferred that the amorphous layer was a mixed layer of lithium niobate and tantalum oxide, and light was absorbed due to the variation of the composition in the amorphous layer and/or the internal stress at the time of forming the amorphous layer, with the result that light was scattered at the interface between the amorphous layer and the electro-optical crystal substrate.

Comparative Example 2

Figure 4:
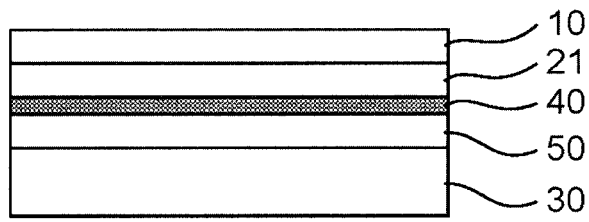
FIG. 4 is a schematic sectional view of a composite substrate for an electro-optical element of each of Comparative Example 2, Comparative Example 4, Comparative Example 6, Comparative Example 8, Comparative Example 10, and Comparative Example 12.

A composite substrate for an electro-optical element of FIG. 4 was obtained in the same manner as in Example 1 except that the second high dielectric layer was not formed on the support substrate (that is, the first high dielectric layer 21 and the low dielectric layer 50 were directly joined to each other). In the obtained composite substrate for an electro-optical element, a defect of peeling occurred at the joining interface. The peeling occurred at a rate of about 30% with respect to the total area of the composite substrate. When an attempt was made to produce another composite substrate (wafer) in the same manner as described above, there were cases in which joining was not able to be performed.

Further, an optical modulator was produced from the above-mentioned composite substrate in which the peeling occurred at a rate of about 30%. The product Vπ·L of the half wavelength voltage Vπ and the electrode length L was 1.0 Vcm. The propagation loss of the optical waveguide was 0.5 dB. Further, the modulation band was 40 GHz, and no ripples were detected in modulation characteristics at a frequency equal to or less than this frequency.

As the reason for a decrease in modulation band, a decrease in dielectric constant of the first high dielectric layer 21 is conceived. It may be inferred that, when the amorphous layer 40 was formed at the interface between the first high dielectric layer 21 and the low dielectric layer 50 at the time of direct joining, the dielectric constant of a portion of the first high dielectric layer was decreased due to the diffusion of silicon oxide, and a decrease in effective dielectric constant and effective refractive index of an electric signal was not able to be suppressed, with the result that the modulation band was decreased due to the deviation from the speed matching condition.

Examples 3 to 16 and Comparative Examples 3 to 12

Each composite substrate for an electro-optical element was produced with the configuration shown in Table 1, and the presence or absence of defects such as peeling of the joining interface was observed. Further, an optical modulator was produced from the obtained composite substrate and subjected to the same evaluation as that in Example 1. The results are shown in Table 1.

TABLE 1

| | Structure | Electro-optical crystal substrate | First high dielectric layer | Second high dielectric layer | Low dielectric layer | Support substrate | Peeling of joining portion | VπL (Vcm) | Light propagation loss (dB) | Modulation band (GHz) |
|---|---|---|---|---|---|---|---|---|---|---|
| Example 1 | FIG. 2 | X-cut LiNbO$_3$ | Ta$_2$O$_5$ | Ta$_2$O$_5$ | SiO$_2$ | Si | Absent | 1.0 | 0.5 | 50 |
| Example 2 | FIG. 2 | X-cut LiNbO$_3$ | Ta$_2$O$_5$ | Ta$_2$O$_5$ | Absent | Glass | Absent | 1.0 | 0.5 | 50 |
| Comparative Example 1 | FIG. 3 | X-cut LiNbO$_3$ | Absent | Ta$_2$O$_5$ | SiO$_2$ | Si | Absent | 1.2 | 1.0 | 50 |
| Comparative Example 2 | FIG. 4 | X-cut LiNbO$_3$ | Ta$_2$O$_5$ | Absent | SiO$_2$ | Si | Present | 1.0 | 0.5 | 40 |
| Example 3 | FIG. 2 | X-cut LiTaO$_3$ | Ta$_2$O$_5$ | Ta$_2$O$_5$ | SiO$_2$ | Si | Absent | 1.2 | 0.5 | 50 |
| Example 4 | FIG. 2 | X-cut LiTaO$_3$ | Ta$_2$O$_5$ | Ta$_2$O$_5$ | Absent | Glass | Absent | 1.2 | 0.5 | 50 |
| Comparative Example 3 | FIG. 3 | X-cut LiTaO$_3$ | Absent | Ta$_2$O$_5$ | SiO$_2$ | Si | Absent | 1.4 | 1.0 | 50 |
| Comparative Example 4 | FIG. 4 | X-cut LiTaO$_3$ | Ta$_2$O$_5$ | Absent | SiO$_2$ | Si | Present | 1.2 | 0.5 | 40 |
| Example 5 | FIG. 2 | X-cut LiNbO$_3$ | Nb$_2$O$_5$ | Nb$_2$O$_5$ | SiO$_2$ | Si | Absent | 1.0 | 0.5 | 50 |
| Example 6 | FIG. 2 | X-cut LiNbO$_3$ | Nb$_2$O$_5$ | Nb$_2$O$_5$ | Absent | Glass | Absent | 1.0 | 0.5 | 50 |
| Comparative Example 5 | FIG. 3 | X-cut LiNbO$_3$ | Absent | Nb$_2$O$_5$ | SiO$_2$ | Si | Absent | 1.2 | 1.0 | 50 |
| Comparative Example 6 | FIG. 4 | X-cut LiNbO$_3$ | Nb$_2$O$_5$ | Absent | SiO$_2$ | Si | Present | 1.0 | 0.5 | 40 |
| Example 7 | FIG. 2 | X-cut LiNbO$_3$ | Amorphous Si | Amorphous Si | SiO$_2$ | Si | Absent | 1.0 | 0.5 | 55 |
| Example 8 | FIG. 2 | X-cut LiNbO$_3$ | Amorphous Si | Amorphous Si | Absent | Glass | Absent | 1.0 | 0.5 | 55 |
| Comparative Example 7 | FIG. 3 | X-cut LiNbO$_3$ | Absent | Amorphous Si | SiO$_2$ | Si | Absent | 1.2 | 1.0 | 55 |
| Comparative Example 8 | FIG. 4 | X-cut LiNbO$_3$ | Amorphous Si | Absent | SiO$_2$ | Si | Present | 1.0 | 0.5 | 45 |
| Example 9 | FIG. 2 | X-cut LiNbO$_3$ | Al$_2$O$_3$ | Al$_2$O$_3$ | SiO$_2$ | Si | Absent | 1.0 | 0.5 | 47 |
| Example 10 | FIG. 2 | X-cut LiNbO$_3$ | Al$_2$O$_3$ | Al$_2$O$_3$ | Absent | Glass | Absent | 1.0 | 0.5 | 47 |
| Comparative Example 9 | FIG. 3 | X-cut LiNbO$_3$ | Absent | Al$_2$O$_3$ | SiO$_2$ | Si | Absent | 1.2 | 1.0 | 47 |
| Comparative Example 10 | FIG. 4 | X-cut LiNbO$_3$ | Al$_2$O$_3$ | Absent | SiO$_2$ | Si | Present | 1.0 | 0.5 | 37 |
| Example 11 | FIG. 2 | X-cut LiNbO$_3$ | Ta$_2$O$_5$ | Ta$_2$O$_5$ | Absent | Quartz | Absent | 1.0 | 0.5 | 50 |
| Example 12 | FIG. 2 | X-cut LiNbO$_3$ | Ta$_2$O$_5$ | Ta$_2$O$_5$ | Absent | Sapphire | Absent | 1.0 | 0.5 | 48 |
| Example 13 | FIG. 2 | X-cut LiNbO$_3$ | Ta$_2$O$_5$ | Ta$_2$O$_5$ | SiO$_2$ | X-cut LiNbO$_3$ | Absent | 1.0 | 0.5 | 50 |
| Example 14 | FIG. 2 | X-cut LiNbO$_3$ | Ta$_2$O$_5$ | Ta$_2$O$_5$ | SiO$_2$ | Aluminum nitride | Absent | 1.0 | 0.5 | 50 |
| Example 15 | FIG. 2 | Z-cut LiNbO$_3$ | Ta$_2$O$_5$ | Ta$_2$O$_5$ | SiO$_2$ | Si | Absent | 1.5 | 0.5 | 50 |
| Example 16 | FIG. 2 | Z-cut LiNbO$_3$ | Ta$_2$O$_5$ | Ta$_2$O$_5$ | Absent | Glass | Absent | 1.5 | 0.5 | 50 |
| Comparative Example 11 | FIG. 3 | Z-cut LiNbO$_3$ | Absent | Ta$_2$O$_5$ | SiO$_2$ | Si | Absent | 1.7 | 1.0 | 50 |
| Comparative Example 12 | FIG. 4 | Z-cut LiNbO$_3$ | Ta$_2$O$_5$ | Absent | SiO$_2$ | Si | Present | 1.5 | 0.5 | 40 |

As is apparent from Table 1, according to the Examples of the present invention, when the two high dielectric layers (first high dielectric layer and second high dielectric layer) are directly joined to each other to integrate the electro-optical crystal substrate and the support substrate, a composite substrate for an electro-optical element in which peeling is suppressed can be obtained. Further, it is understood that each of the composite substrates for an electro-optical element of the Examples of the present invention can achieve an electro-optical element (for example, an optical modulator) which has small light propagation loss and in which high-speed and low-voltage drive is possible.

Figure 5:
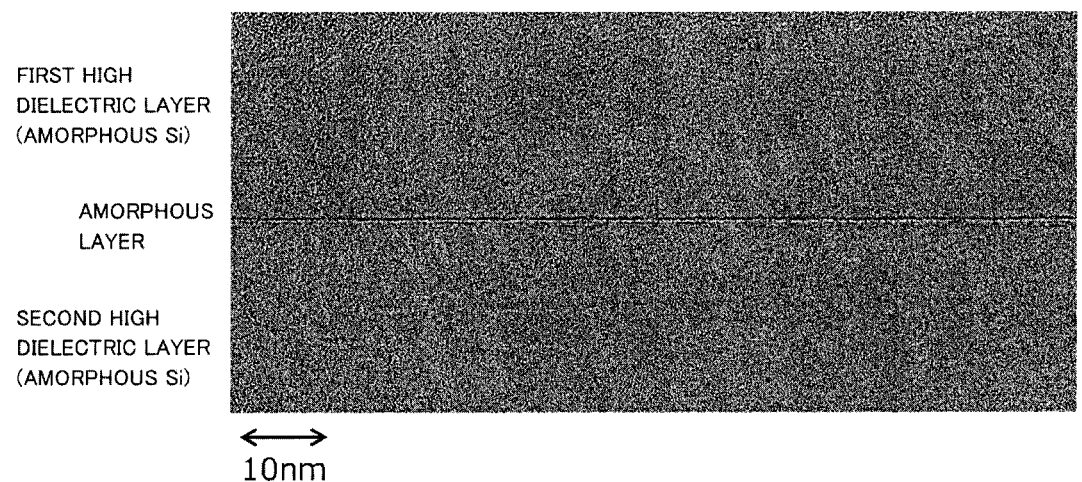
FIG. 5 is a transmission electron microscope image for showing a state of a joining interface between a first high dielectric layer and a second high dielectric layer in a composite substrate for an electro-optical element of Example V.

Further, the joining interface between the first high dielectric layer and the second high dielectric layer in the composite substrate for an electro-optical element of Example 7 was observed with a transmission electron microscope (TEM). A TEM image (magnification: 2 million times) is shown in FIG. 5. As is apparent from FIG. 5, it was recognized that an amorphous layer was formed at the joining interface between the first high dielectric layer and the second high dielectric layer. At the same time, the composition of each of the vicinity of the interface between the first high dielectric layer and the amorphous layer, the amorphous layer, and the vicinity of the interface between the amorphous layer and the second high dielectric layer was examined by energy dispersive X-ray analysis (EDX). The results are shown in Table 2. As is apparent from Table 2, the amorphous layer and the vicinity thereof contained argon derived from a neutral atom beam used for direct joining. Oxygen in the vicinity of the amorphous layer is detected based on oxygen generated from water adsorbed by a jig of a film forming apparatus and based on oxidation after film formation. As required, oxygen may be intentionally doped from the viewpoint of optical characteristics, electrical characteristics, and joining strength.

TABLE 2

| | Composition unit (atomic %) | | |
|---|---|---|---|
| | Si | O | Ar |
| Vicinity of interface between first high dielectric layer and amorphous layer | 92.2 | 7.4 | 0.5 |
| Amorphous layer | 89.8 | 8.1 | 2.1 |
| Vicinity of interface between amorphous layer and second high dielectric layer | 94.5 | 4.9 | 0.6 |

Example 17

An X-cut lithium niobate substrate having a diameter of 4 inches was prepared as an electro-optical crystal substrate, and a glass substrate having a diameter of 4 inches (thickness: 500 μm) was prepared as a support substrate. The support substrate (glass substrate) was formed by a sol-gel method to be highly purified. The argon ion concentration of the glass substrate was measured through use of energy dispersive X-ray analysis and found to be 1 atomic %. A composite substrate was produced through use of the electro-optical crystal substrate and the support substrate. Specifically, the composite substrate was produced as follows. First, tantalum oxide was sputtered onto each of the electro-optical crystal substrate and the glass substrate to form a first high dielectric layer and a second high dielectric layer each having a thickness of 0.03 μm. The argon concentrations of the formed first high dielectric layer and the formed second high dielectric layer were measured by energy dispersive X-ray analysis and found to be 1 atomic %. Here, the arithmetic average roughness of the interface between the first high dielectric layer and the electro-optical crystal substrate and the arithmetic average roughness of the interface between the second high dielectric layer and the support substrate were measured through use of an atomic force microscope and found to be 0.2 nm at 10 μm square. Further, the arithmetic average roughness of each of the surfaces of the first high dielectric layer and the second high dielectric layer was measured and found to be 0.2 nm at 10 μm square. Next, the surfaces of the first high dielectric layer and the second high dielectric layer were washed, and then the first high dielectric layer and the second high dielectric layer were directly joined to each other to integrate the electro-optical crystal substrate and the support substrate. The direct joining was performed as described below. The electro-optical crystal substrate and the support substrate were loaded into a vacuum chamber, and joining surfaces of the electro-optical crystal substrate and the support substrate (surfaces of the first high dielectric layer and the second high dielectric layer) were irradiated with a high-speed Ar neutral atom beam (acceleration voltage: 1 kV, Ar flow rate: 60 sccm) for 70 seconds in a vacuum on the order of $10^{-6}$ Pa. After the irradiation, the electro-optical crystal substrate and the support substrate were left to stand for 10 minutes so that they were allowed to cool. Then, the joining surfaces (beam irradiation surfaces of the first high dielectric layer and the second high dielectric layer) of the electro-optical crystal substrate and the support substrate were brought into contact with each other and pressurized at 4.90 kN for 2 minutes to join the electro-optical crystal substrate and the support substrate to each other. After the joining, the electro-optical crystal substrate was polished to have a thickness of 0.6 μm to obtain a composite substrate for an electro-optical element having a configuration of electro-optical crystal substrate/first high dielectric layer/amorphous layer/second high dielectric layer/support substrate (that is, a configuration obtained by excluding the low dielectric layer from the configuration of FIG. 2). In the obtained composite substrate for an electro-optical element, no defects such as peeling were observed at the joining interface.

Through use of the composite substrate obtained in the above, an optical waveguide (ridge type waveguide) and electrodes were formed to produce an optical modulator. When the gap between the electrodes was set to 3 μm, and the electrode length L was set to 1 cm, the product Vπ·L of the half wavelength voltage Vπ and the electrode length L was 1.0 Vcm. The propagation loss of the optical waveguide was 0.5 dB. Further, as a result of measuring the modulation band of the optical modulator with an optical component analyzer, the modulation band was 50 GHz, and no ripples were detected in modulation characteristics at a frequency equal to or less than this frequency.

Further, the above-mentioned optical modulator was subjected to a reliability test (high-temperature holding test at 80° C. for 500 hours), and the same evaluation as that in the above was performed. As a result, there was no change in half wavelength voltage Vπ, propagation loss of the optical waveguide, and measurement value of the modulation band, and no peeling of the electro-optical crystal substrate was recognized in visual inspection. As described above, the optical modulator of this Example exhibited significantly excellent reliability under a severe high temperature environment. Those results are collectively shown in Table 3.

Comparative Example 17a

An argon-containing glass substrate was used as the support substrate. The argon ion concentration of this glass substrate was measured by energy dispersive X-ray analysis and found to be 2 atomic %. A composite substrate for an electro-optical element was obtained in the same manner as in Example 17 except that this support substrate was used. Here, the argon concentration of each of the first high dielectric layer and the second high dielectric layer was measured by energy dispersive X-ray analysis and found to be 11 atomic %. In the obtained composite substrate for an electro-optical element, no defects such as peeling were observed at the joining interface. Further, from the obtained composite substrate, an optical modulator was produced in the same manner as in Example 17. The product Vπ·L of the half wavelength voltage Vπ and the electrode length L of the obtained optical modulator was 1.0 Vcm, and the propagation loss of the optical waveguide was 0.5 dB. In addition, the modulation band of the optical modulator was 50 GHz, and no ripples were detected in modulation characteristics at a frequency equal to or less than this frequency. Further, the optical modulator was subjected to the same reliability test as that in Example 17. As a result, the peeling of the electro-optical crystal substrate occurred, and the characteristics were not able to be evaluated. Those results are collectively shown in Table 3. In order to facilitate comparison, the numbers of Comparative Examples and Reference Examples shown in Table 3 are associated with those in the Examples.

Examples 18 to 21, Comparative Examples 17b to 21b, and Reference Examples 17a to 21b Each composite substrate for an electro-optical element was produced with the configuration shown in Table 3, and the presence or absence of defects such as peeling of the joining interface was observed. Further, an optical modulator was produced from the obtained composite substrate and subjected to the same evaluation as that in Example 1. In addition, the optical modulator was subjected to the same reliability test as that in Example 17. The results are shown in Table 3.

TABLE 3

| | Electro-optical crystal substrate | Thickness of electro-optical crystal substrate (μm) | First high dielectric layer | Second high dielectric layer | Ar concentration (atomic %) in first and second high dielectric layers | Support substrate | Ar concentration (atomic %) in support substrate |
|---|---|---|---|---|---|---|---|
| Example 17 | X-cut LiNbO$_3$ | 0.6 | Ta$_2$O$_5$ | Ta$_2$O$_5$ | 1 | Glass | 1 |
| Comparative Example 17a | ↓ | ↓ | ↓ | ↓ | 11 | Argon-containing glass | 2 |
| Comparative Example 17b | ↓ | ↓ | ↓ | ↓ | 11 | Sapphire | 1 |
| Reference Example 17a | ↓ | 1.0 | ↓ | ↓ | 1 | Glass | 1 |
| Reference Example 17b | ↓ | ↓ | ↓ | ↓ | 11 | Sapphire | 1 |
| Example 18 | X-cut LiNbO$_3$ | 0.6 | Nb$_2$O$_5$ | Nb$_2$O$_5$ | 10 | Glass | 1 |
| Comparative Example 18a | ↓ | ↓ | ↓ | ↓ | 11 | Argon-containing glass | 2 |
| Comparative Example 18b | ↓ | ↓ | ↓ | ↓ | 11 | Sapphire | 1 |
| Reference Example 18a | ↓ | 1.0 | ↓ | ↓ | 10 | Glass | 1 |
| Reference Example 18b | ↓ | ↓ | ↓ | ↓ | 11 | Sapphire | 1 |
| Example 19 | X-cut LiNbO$_3$ | 0.6 | Amorphous Si | Amorphous Si | 5 | Glass | 1 |
| Comparative Example 19a | ↓ | ↓ | ↓ | ↓ | 11 | Argon-containing glass | 2 |
| Comparative Example 19b | ↓ | ↓ | ↓ | ↓ | 11 | Sapphire | 1 |
| Reference Example 19a | ↓ | 1.0 | ↓ | ↓ | 5 | Glass | 1 |
| Reference Example 19b | ↓ | ↓ | ↓ | ↓ | 11 | Sapphire | 1 |
| Example 20 | X-cut LiNbO$_3$ | 0.6 | Al$_2$O$_3$ | Al$_2$O$_3$ | 5 | Glass | 1 |
| Comparative Example 20a | ↓ | ↓ | ↓ | ↓ | 11 | Argon-containing glass | 2 |
| Comparative Example 20b | ↓ | ↓ | ↓ | ↓ | 11 | Sapphire | 1 |
| Reference Example 20a | ↓ | 1.0 | ↓ | ↓ | 5 | Glass | 1 |
| Reference Example 20b | ↓ | ↓ | ↓ | ↓ | 11 | Sapphire | 1 |

TABLE 3-continued

| | | | | | | | |
|---|---|---|---|---|---|---|---|
| Example 21 | Z-cut LiNbO₃ | 0.6 | Ta₂O₅ | Ta₂O₅ | 5 | Glass | 1 |
| Comparative Example 21a | ↓ | ↓ | ↓ | ↓ | 11 | Argon-containing glass | 2 |
| Comparative Example 21b | ↓ | ↓ | ↓ | ↓ | 11 | Sapphire | 1 |
| Reference Example 21a | ↓ | 1.0 | ↓ | ↓ | 5 | Glass | 1 |
| Reference Example 21b | ↓ | ↓ | ↓ | ↓ | 11 | Sapphire | 1 |

| | Peeling of joining portion | VπL (Vcm) | Light propagation loss (dB) | Modulation band (GHz) | Peeling of electro-optical crystal substrate after reliability test |
|---|---|---|---|---|---|
| Example 17 | Absent | 1.0 | 0.5 | 50 | Absent |
| Comparative Example 17a | ↓ | ↓ | ↓ | ↓ | Present |
| Comparative Example 17b | ↓ | ↓ | ↓ | 43 | Present |
| Reference Example 17a | ↓ | ↓ | ↓ | 50 | Absent |
| Reference Example 17b | ↓ | ↓ | ↓ | 43 | Absent |
| Example 18 | Absent | 1.0 | 0.5 | 50 | Absent |
| Comparative Example 18a | ↓ | ↓ | ↓ | ↓ | Present |
| Comparative Example 18b | ↓ | ↓ | ↓ | 43 | Present |
| Reference Example 18a | ↓ | ↓ | ↓ | 50 | Absent |
| Reference Example 18b | ↓ | ↓ | ↓ | 43 | Absent |
| Example 19 | Absent | 1.0 | 0.5 | 55 | Absent |
| Comparative Example 19a | ↓ | ↓ | ↓ | ↓ | Present |
| Comparative Example 19b | ↓ | ↓ | ↓ | 43 | Present |
| Reference Example 19a | ↓ | ↓ | ↓ | 55 | Absent |
| Reference Example 19b | ↓ | ↓ | ↓ | 45 | Absent |
| Example 20 | Absent | 1.0 | 0.5 | 47 | Absent |
| Comparative Example 20a | ↓ | ↓ | ↓ | ↓ | Present |
| Comparative Example 20b | ↓ | ↓ | ↓ | 45 | Present |
| Reference Example 20a | ↓ | ↓ | ↓ | 50 | Absent |
| Reference Example 20b | ↓ | ↓ | ↓ | 45 | Absent |
| Example 21 | Absent | 1.5 | 0.5 | 50 | Absent |
| Comparative Example 21a | ↓ | ↓ | ↓ | ↓ | Present |
| Comparative Example 21b | ↓ | ↓ | ↓ | 43 | Present |
| Reference Example 21a | ↓ | ↓ | ↓ | 50 | Absent |
| Reference Example 21b | ↓ | ↓ | ↓ | 43 | Absent |

As is apparent from Table 3, according to the Examples of the present invention, when the support substrate is formed of silicon oxide as a main component, and the argon concentration in the support substrate is set to 1.0 atomic % or less, it is possible to achieve an extremely thin electro-optical element capable of maintaining excellent reliability even under a severe high-temperature environment. Further, as is apparent from the Reference Examples, it is understood that such an effect is peculiar to the case where the electro-optical crystal substrate is thinned to less than 1 μm.

Example 22

An X-cut lithium niobate substrate having a diameter of 4 inches was prepared as an electro-optical crystal substrate, and a silicon substrate having a diameter of 4 inches (thickness: 500 μm) was prepared as a support substrate. First, tantalum oxide was sputtered onto the electro-optical crystal substrate to form a first high dielectric layer having a thickness of 0.03 μm. Next, silicon oxide was sputtered onto the support substrate to form a low dielectric layer having a thickness of 12.0 μm. The obtained low dielectric layer was slightly subjected to CMP to reduce the arithmetic average roughness Ra on the surface of the low dielectric layer. Next, the surface of the low dielectric layer was washed, and tantalum oxide was sputtered onto the washed surface to form a second high dielectric layer having a thickness of 0.03 μm. Here, the argon ion concentration of the low dielectric layer was measured through use of energy dispersive X-ray analysis and found to be 1 atomic %. The argon concentration in the low dielectric layer was controlled by changing the argon partial pressure during sputtering. Further, the argon concentration of each of the first high dielectric layer and the second high dielectric layer was measured by energy dispersive X-ray analysis, and as a result, found to be 1 atomic %. Further, the arithmetic average roughness of the interface between the first high dielectric layer and the electro-optical crystal substrate and the arithmetic average roughness of the interface between the second high dielectric layer and the support substrate were measured through use of an atomic force microscope and found to be 0.2 nm at 10 μm square. Further, the arithmetic average roughness of each of the surfaces of the first high dielectric layer and the second high dielectric layer was measured and found to be 0.2 nm at 10 μm square. Next, the surfaces of the first high dielectric layer and the second high dielectric layer were washed, and then the first high dielectric layer and the second high dielectric layer were directly joined to each other to integrate the electro-optical crystal substrate and the support substrate. The direct joining was performed as follows. The electro-optical crystal substrate and the support substrate were loaded into a vacuum chamber, and joining surfaces of the electro-optical crystal substrate and the support substrate (surfaces of the first high dielectric layer and the second high dielectric layer) were irradiated with a high-speed Ar neutral atom beam (acceleration voltage: 1 kV, Ar flow rate: 60 sccm) for 70 seconds in a vacuum on the order of $10^{-6}$ Pa. After the irradiation, the electro-optical crystal substrate and the support substrate were left to stand for 10 minutes so that they were allowed to cool. Then, the joining surfaces (beam irradiation surfaces of the first high dielectric layer and the second high dielectric layer) of the electro-optical crystal substrate and the support substrate were brought into contact with each other and pressurized at 4.90 kN for 2 minutes to join the electro-optical crystal substrate and the support substrate to each other. After the joining, the electro-optical crystal substrate was polished to have a thickness of 0.6 μm to obtain the composite substrate for an electro-optical element which has the configuration illustrated in FIG. 2. In the obtained composite substrate for an electro-optical element, no defects such as peeling were observed at the joining interface.

Through use of the composite substrate obtained in the above, an optical waveguide (ridge type waveguide) and electrodes were formed to produce an optical modulator. When the gap between the electrodes was set to 3 μm, and the electrode length L was set to 1 cm, the product Vπ·L of the half wavelength voltage Vπ and the electrode length L was 1.0 Vcm. The propagation loss of the optical waveguide was 0.5 dB. Further, as a result of measuring the modulation band of the optical modulator with an optical component analyzer, the modulation band was 50 GHz, and no ripples were detected in modulation characteristics at a frequency equal to or less than this frequency.

Further, the above-mentioned optical modulator was subjected to a reliability test (high-temperature holding test at 80° C. for 500 hours), and the same evaluation as that in the above was performed. As a result, there was no change in half wavelength voltage Vπ, propagation loss of the optical waveguide, and measurement value of the modulation band, and no peeling of the electro-optical crystal substrate was recognized in visual inspection. As described above, the optical modulator in this Example exhibited significantly excellent reliability under a severe high-temperature environment. Those results are collectively shown in Table 4.

Comparative Example 22

A composite substrate for an electro-optical element was obtained in the same manner as in Example 22 except that a silicon oxide layer (thickness: 12.0 μm) having an argon concentration of 2 atomic % was formed as the low dielectric layer. The argon concentration in the low dielectric layer was controlled by changing the argon partial pressure during sputtering. Here, the argon concentration of each of the first high dielectric layer and the second high dielectric layer was measured by energy dispersive X-ray analysis and found to be 11 atomic %. In the obtained composite substrate for an electro-optical element, no defects such as peeling were observed at the joining interface. Further, from the obtained composite substrate, an optical modulator was produced in the same manner as in Example 22. The product Vπ·L of the half wavelength voltage Vπ and the electrode length L of the obtained optical modulator was 1.0 Vcm, and the propagation loss of the optical waveguide was 0.5 dB. In addition, the modulation band of the optical modulator was 50 GHz, and no ripples were detected in modulation characteristics at a frequency equal to or less than this frequency. Further, the optical modulator was subjected to the same reliability test as that in Example 22. As a result, the peeling of the electro-optical crystal substrate occurred, and the characteristics were not able to be evaluated. Those results are collectively shown in Table 4. In order to facilitate comparison, the numbers of Comparative Examples and Reference Examples shown in Table 4 are associated with those in the Examples.

Examples 23 to 26, Comparative Examples 23 to 26, and Reference Examples 22 to 26

Each composite substrate for an electro-optical element was produced with the configuration shown in Table 4, and the presence or absence of defects such as peeling of the joining interface was observed. Further, an optical modulator was produced from the obtained composite substrate and subjected to the same evaluation as that in Example 1. In addition, the optical modulator was subjected to the same reliability test as that in Example 22. The results are shown in Table 4.

TABLE 4

| | Electro-optical crystal substrate | Thickness of electro-optical crystal substrate (μm) | First high dielectric layer | Second high dielectric layer | Ar concentration (atomic %) in first and second high dielectric layers | Low dielectric layer | Ar concentration (atomic %) in low dielectric layer |
|---|---|---|---|---|---|---|---|
| Example 22 | X-cut LiNbO$_3$ | 0.6 | Ta$_2$O$_5$ | Ta$_2$O$_5$ | 1 | Silicon oxide | 1 |
| Comparative Example 22 | ↓ | ↓ | ↓ | ↓ | 11 | Argon-containing silicon oxide | 2 |
| Reference Example 22 | ↓ | 1.0 | ↓ | ↓ | 11 | Argon-containing silicon oxide | 2 |
| Example 23 | X-cut LiNbO$_3$ | 0.6 | Nb$_2$O$_5$ | Nb$_2$O$_5$ | 10 | Silicon oxide | 1 |
| Comparative Example 23 | ↓ | ↓ | ↓ | ↓ | 11 | Argon-containing silicon oxide | 2 |
| Reference Example 23 | ↓ | 1.0 | ↓ | ↓ | 11 | Argon-containing silicon oxide | 2 |
| Example 24 | X-cut LiNbO$_3$ | 0.6 | Amorphous Si | Amorphous Si | 5 | Silicon oxide | 1 |
| Comparative Example 24 | ↓ | ↓ | ↓ | ↓ | 11 | Argon-containing silicon oxide | 2 |
| Reference Example 24 | ↓ | 1.0 | ↓ | ↓ | 11 | Argon-containing silicon oxide | 2 |
| Example 25 | X-cut LiNbO$_3$ | 0.6 | Al$_2$O$^3$ | Al$_2$O$_3$ | 5 | Silicon oxide | 1 |
| Comparative Example 25 | ↓ | ↓ | ↓ | ↓ | 11 | Argon-containing silicon oxide | 2 |
| Reference Example 25 | ↓ | 1.0 | ↓ | ↓ | 11 | Argon-containing silicon oxide | 2 |
| Example 26 | Z-cut LiNbO$_3$ | 0.6 | Ta$_2$O$_5$ | Ta$_2$O$_5$ | 5 | Silicon oxide | 1 |
| Comparative Example 26 | ↓ | ↓ | ↓ | ↓ | 11 | Argon-containing silicon oxide | 2 |
| Reference Example 26 | ↓ | 1.0 | ↓ | ↓ | 11 | Argon-containing silicon oxide | 2 |

| | Peeling of joining portion | VπL (Vcm) | Light propagation loss (dB) | Modulation band (GHz) | Peeling of electro-optical crystal substrate after reliability test |
|---|---|---|---|---|---|
| Example 22 | Absent | 1.0 | 0.5 | 50 | Absent |
| Comparative Example 22 | ↓ | ↓ | ↓ | ↓ | Present |
| Reference Example 22 | ↓ | ↓ | ↓ | ↓ | Absent |
| Example 23 | Absent | 1.0 | 0.5 | 50 | Absent |
| Comparative Example 23 | ↓ | ↓ | ↓ | ↓ | Present |
| Reference Example 23 | ↓ | ↓ | ↓ | ↓ | Absent |

TABLE 4-continued

| | | | | | |
|---|---|---|---|---|---|
| Example 24 | Absent | 1.0 | 0.5 | 55 | Absent |
| Comparative Example 24 | ↓ | ↓ | ↓ | ↓ | Present |
| Reference Example 24 | ↓ | ↓ | ↓ | ↓ | Absent |
| Example 25 | Absent | 1.0 | 0.5 | 47 | Absent |
| Comparative Example 25 | ↓ | ↓ | ↓ | ↓ | Present |
| Reference Example 25 | ↓ | ↓ | ↓ | 50 | Absent |
| Example 26 | Absent | 1.5 | 0.5 | 50 | Absent |
| Comparative Example 26 | ↓ | ↓ | ↓ | ↓ | Present |
| Reference Example 26 | ↓ | ↓ | ↓ | ↓ | Absent |

As is apparent from Table 4, according to the Examples of the present invention, when the low dielectric layer is formed of silicon oxide as a main component, and the argon concentration in the low dielectric layer is set to 1.0 atomic % or less, it is possible to achieve an extremely thin electro-optical element capable of maintaining excellent reliability even under a severe high-temperature environment. Further, as is apparent from the Reference Examples, it is understood that such an effect is peculiar to the case where the electro-optical crystal substrate is thinned to less than 1 μm.

Example 27

An X-cut lithium niobate substrate having a diameter of 4 inches was prepared as an electro-optical crystal substrate, and a silicon substrate having a diameter of 4 inches (thickness: 500 μm) was prepared as a support substrate. First, tantalum oxide was sputtered onto the electro-optical crystal substrate to form a first high dielectric layer having a thickness of 0.01 μm. Next, silicon oxide was sputtered onto the support substrate to form a low dielectric layer having a thickness of 12.0 μm. The obtained low dielectric layer was slightly subjected to CMP to reduce the arithmetic average roughness Ra on the surface of the low dielectric layer. Next, the surface of the low dielectric layer was washed, and tantalum oxide was sputtered onto the washed surface to form a second high dielectric layer having a thickness of 0.03 μm. Here, the arithmetic average roughness of the interface between the second high dielectric layer and the low dielectric layer and the arithmetic average roughness of the interface between the low dielectric layer and the support substrate were measured through use of an atomic force microscope and found to be 0.2 nm at 10 μm square. Next, the surfaces of the first high dielectric layer and the second high dielectric layer were washed, and then the first high dielectric layer and the second high dielectric layer were directly joined to each other to integrate the electro-optical crystal substrate and the support substrate. The direct joining was performed as follows. The electro-optical crystal substrate and the support substrate were loaded into a vacuum chamber, and joining surfaces of the electro-optical crystal substrate and the support substrate (surfaces of the first high dielectric layer and the second high dielectric layer) were irradiated with a high-speed Ar neutral atom beam (acceleration voltage: 1 kV, Ar flow rate: 60 sccm) for 70 seconds in a vacuum on the order of $10^{-6}$ Pa. After the irradiation, the electro-optical crystal substrate and the support substrate were left to stand for 10 minutes so that they were allowed to cool. Then, the joining surfaces (beam irradiation surfaces of the first high dielectric layer and the second high dielectric layer) of the electro-optical crystal substrate and the support substrate were brought into contact with each other and pressurized at 4.90 kN for 2 minutes to join the electro-optical crystal substrate and the support substrate to each other. After the joining, the electro-optical crystal substrate was polished to have a thickness of 0.6 μm to obtain the composite substrate for an electro-optical element which has the configuration illustrated in FIG. 2. In the obtained composite substrate for an electro-optical element, no defects such as peeling were observed at the joining interface.

Through use of the composite substrate obtained in the above, an optical waveguide (ridge type waveguide) and electrodes were formed to produce an optical modulator. When the gap between the electrodes was set to 3 μm, and the electrode length L was set to 1 cm, the product Vπ·L of the half wavelength voltage Vπ and the electrode length L was 1.0 Vcm. The propagation loss of the optical waveguide was 0.5 dB. Further, as a result of measuring the modulation band of the optical modulator with an optical component analyzer, the modulation band was 50 GHz, and no ripples were detected in modulation characteristics at a frequency equal to or less than this frequency.

Example 28

A composite substrate for an electro-optical element was produced in the same manner as in Example 27 except that the thickness of the first high dielectric layer was set to 0.05 μm. In the obtained composite substrate for an electro-optical element, no defects such as peeling were observed at the joining interface. Further, an optical modulator was produced from the obtained composite substrate and subjected to the same evaluation as that in Example 1. The results are shown in Table 5.

Example 29

A composite substrate for an electro-optical element was produced in the same manner as in Example 27 except that the thickness of the first high dielectric layer was set to 0.07 μm. In the obtained composite substrate for an electro-optical element, no defects such as peeling were observed at the joining interface. Further, an optical modulator was produced from the obtained composite substrate and subjected to the same evaluation as that in Example 1. The results are shown in Table 5.

Comparative Examples 27 to 29 and Reference Examples 27 and 28

Each composite substrate for an electro-optical element was produced with the configuration shown in Table 5. In the obtained composite substrate for an electro-optical element, no defects such as peeling were observed at the joining interface. Further, an optical modulator was produced from the obtained composite substrate and subjected to the same evaluation as that in Example 1. The results are shown in Table 5.

Example 30

A composite substrate for an electro-optical element was produced in the same manner as in Example 27 except that a glass substrate (thickness: 500 μm) was used as the support substrate, and the second high dielectric layer was directly formed on the support substrate without forming the low dielectric layer. In the obtained composite substrate for an electro-optical element, no defects such as peeling were observed at the joining interface. Further, an optical modulator was produced from the obtained composite substrate and subjected to the same evaluation as that in Example 1. The results are shown in Table 5.

Examples 31 and 32, Comparative Examples 30 to 32, and Reference Examples 29 and 30

Each composite substrate for an electro-optical element was produced with the configuration shown in Table 5. In the obtained composite substrate for an electro-optical element, no defects such as peeling were observed at the joining interface. Further, an optical modulator was produced from the obtained composite substrate and subjected to the same evaluation as that in Example 1. The results are shown in Table 5.

As is apparent from Table 5, according to the Examples of the present invention, even when the electro-optical crystal substrate is thinned to less than 1 μm (for example, 0.6 μm), excellent effects achieved by directly joining the two high dielectric layers to each other to integrate the electro-optical crystal substrate and the support substrate (typically, significant suppression of the peeling, suppression of the light propagation loss when used as an electro-optical element, and achievement of the high-speed and low-voltage drive) can be maintained.

Further, in the configurations corresponding to Examples 27 to 32, Comparative Examples 27 to 32, and Reference Examples 27 to 30, it was recognized that the same results are obtained even when the materials forming the first high dielectric layer and the second high dielectric layer are each changed to $Al_2O_3$, $Nb_2O_5$, or amorphous silicon.

INDUSTRIAL APPLICABILITY

The composite substrate according to the embodiment of the present invention may be suitably used for an electro-optical element (for example, an optical modulator).

REFERENCE SIGNS LIST 10 electro-optical crystal substrate
21 first high dielectric layer
22 second high dielectric layer
30 support substrate
40 amorphous layer
50 low dielectric layer
100 composite substrate for electro-optical element

TABLE 5

| | Electro-optical crystal substrate | First high dielectric layer | Second high dielectric layer | Total thickness of high dielectric layer | Low dielectric layer | Support substrate | VπL (Vcm) | Light propagation loss (dB) | Modulation band (GHz) |
|---|---|---|---|---|---|---|---|---|---|
| Example 27 | X-cut LiNbO$_3$ 0.6 μm | Ta$_2$O$_5$ 0.01 μm | Ta$_2$O$_5$ 0.03 μm | 0.04 μm | SiO$_2$ 12 μm | Si | 1 | 0.5 | 50 |
| Example 28 | ↓ | Ta$_2$O$_5$ 0.05 μm | ↓ | 0.08 μm | ↓ | ↓ | 1 | 0.5 | 50 |
| Example 29 | ↓ | Ta$_2$O$_5$ 0.07 μm | ↓ | 0.10 μm | ↓ | ↓ | 1 | 0.5 | 50 |
| Comparative Example 27 | ↓ | Ta$_2$O$_5$ 0.08 μm | ↓ | 0.11 μm | ↓ | ↓ | 1 | 0.5 | 45 |
| Comparative Example 28 | ↓ | Ta$_2$O$_5$ 0.005 μm | ↓ | 0.035 μm | ↓ | ↓ | 1.5 | 1 | 50 |
| Comparative Example 29 | ↓ | Ta$_2$O$_5$ 0.005 μm | Ta$_2$O$_5$ 0.05 μm | 0.055 μm | ↓ | ↓ | 1.5 | 1 | 50 |
| Reference Example 27 | X-cut LiNbO$_3$ 1 μm | Ta$_2$O$_5$ 0.01 μm | Ta$_2$O$_5$ 0.03 μm | 0.04 μm | ↓ | ↓ | 1 | 0.5 | 50 |
| Reference Example 28 | ↓ | Ta$_2$O$_5$ 0.005 μm | Ta$_2$O$_5$ 0.03 μm | 0.035 μm | ↓ | ↓ | 1 | 0.5 | 50 |
| Example 30 | X-cut LiNbO$_3$ 0.6 μm | Ta$_2$O$_5$ 0.01 μm | Ta$_2$O$_5$ 0.03 μm | 0.04 μm | Absent | Glass | 1 | 0.5 | 50 |
| Example 31 | ↓ | Ta$_2$O$_5$ 0.05 μm | ↓ | 0.08 μm | ↓ | ↓ | 1 | 0.5 | 50 |
| Example 32 | ↓ | Ta$_2$O$_5$ 0.07 μm | ↓ | 0.10 μm | ↓ | ↓ | 1 | 0.5 | 50 |
| Comparative Example 30 | ↓ | Ta$_2$O$_5$ 0.08 μm | ↓ | 0.11 μm | ↓ | ↓ | 1 | 0.5 | 45 |
| Comparative Example 31 | ↓ | Ta$_2$O$_5$ 0.005 μm | ↓ | 0.035 μm | ↓ | ↓ | 1.5 | 1 | 50 |
| Comparative Example 32 | ↓ | Ta$_2$O$_5$ 0.005 μm | Ta$_2$O$_5$ 0.05 μm | 0.055 μm | ↓ | ↓ | 1.5 | 1 | 50 |
| Reference Example 29 | X-cut LiNbO$_3$ 1 μm | Ta$_2$O$_5$ 0.01 μm | Ta$_2$O$_5$ 0.03 μm | 0.04 μm | ↓ | ↓ | 1 | 0.5 | 50 |
| Reference Example 30 | ↓ | Ta$_2$O$_5$ 0.005 μm | Ta$_2$O$_5$ 0.03 μm | 0.035 μm | ↓ | ↓ | 1 | 0.5 | 50 |

The invention claimed is:

1. A composite substrate for an electro-optical element, comprising: an electro-optical crystal substrate having an electro-optical effect; a first high dielectric layer; a second high dielectric layer; and a support substrate in the stated order,
wherein the first high dielectric layer and the second high dielectric layer are directly joined to each other,
wherein an amorphous layer is formed at a joining interface between the first high dielectric layer and the second high dielectric layer,
wherein the first high dielectric layer is directly formed on the electro-optical crystal substrate, and the second high dielectric layer is directly formed on the support substrate, and
wherein the support substrate contains silicon oxide as a main component, and an argon concentration in the support substrate is 0.1 atomic % to 1.0 atomic %.

2. The composite substrate for an electro-optical element according to claim 1, wherein argon concentrations in the first high dielectric layer and the second high dielectric layer are each from 1.0 atomic % to 10 atomic %.

3. The composite substrate for an electro-optical element according to claim 1, wherein the electro-optical crystal substrate has a thickness of from 0.1 μm to 0.8 μm.

4. The composite substrate for an electro-optical element according to claim 3, wherein the electro-optical crystal substrate has a thickness of from 0.2 μm to 0.6 μm.

5. The composite substrate for an electro-optical element according to claim 1, wherein the electro-optical crystal substrate is formed of one selected from lithium niobate, lithium tantalate, potassium titanate phosphate, potassium lithium niobate, potassium niobate, potassium tantalate niobate, and a solid solution of lithium niobate and lithium tantalate.

6. The composite substrate for an electro-optical element according to claim 1, wherein the first high dielectric layer has a thickness of from 0.01 μm to 0.08 μm,
and wherein the second high dielectric layer has a thickness of from 0.001 μm to 0.04 μm.

7. The composite substrate for an electro-optical element according to claim 1, wherein the first high dielectric layer and the second high dielectric layer are each formed of one selected from tantalum oxide, niobium oxide, titanium oxide, aluminum oxide, hafnium oxide, and silicon.

8. A composite substrate for an electro-optical element, comprising: an electro-optical crystal substrate having an electro-optical effect; a first high dielectric layer; a second high dielectric layer; and a support substrate in the stated order,
wherein the first high dielectric layer and the second high dielectric layer are directly joined to each other,
wherein an amorphous layer is formed at a joining interface between the first high dielectric layer and the second high dielectric layer,
wherein the first high dielectric layer is directly formed on the electro-optical crystal substrate, a low dielectric layer is directly formed on the support substrate, and the second high dielectric layer is directly formed on the low dielectric layer,
wherein the low dielectric layer contains silicon oxide as a main component, and
wherein the low dielectric layer contains argon, and the argon concentration in the low dielectric layer is 1.0 atomic % or less.

9. The composite substrate for an electro-optical element according to claim 8,
wherein the low dielectric layer is formed of one selected from silicon oxide, aluminum oxide, magnesium fluoride, and calcium fluoride.

10. The composite substrate for an electro-optical element according to claim 9, wherein the support substrate is formed of one selected from silicon, glass, sialon, mullite, aluminum nitride, silicon nitride, magnesium oxide, sapphire, quartz, crystal, gallium nitride, silicon carbide, and gallium oxide.

11. The composite substrate for an electro-optical element according to claim 9, wherein the low dielectric layer has a thickness of more than 10 μm and 20 μm or less.

12. The composite substrate for an electro-optical element according to claim 8, wherein the support substrate is formed of one selected from silicon, glass, sialon, mullite, aluminum nitride, silicon nitride, magnesium oxide, sapphire, quartz, crystal, gallium nitride, silicon carbide, and gallium oxide.

13. The composite substrate for an electro-optical element according to claim 8, wherein the low dielectric layer has a thickness of more than 10 μm and 20 μm or less.

14. The composite substrate for an electro-optical element according to claim 8, wherein argon concentrations in the first high dielectric layer and the second high dielectric layer are each from 1.0 atomic % to 10 atomic %.

* * * * *